Re. 24968

Sept. 13, 1955 H. F. KLINGENER 2,717,929

PHONOGRAPH PICKUPS

Filed April 10, 1952 5 Sheets-Sheet 1

INVENTOR.
H. F. KLINGENER

BY

Greene, Pineles & Durr
ATTORNEYS

Sept. 13, 1955 H. F. KLINGENER 2,717,929

PHONOGRAPH PICKUPS

Filed April 10, 1952 5 Sheets-Sheet 2

INVENTOR.
H. F. KLINGENER

BY

Greene, Pineles & Durr
ATTORNEYS

Sept. 13, 1955 H. F. KLINGENER 2,717,929

PHONOGRAPH PICKUPS

Filed April 10, 1952 5 Sheets-Sheet 3

INVENTOR.
H. F. KLINGENER

BY

Greene, Pineles & Durr

ATTORNEYS

Sept. 13, 1955 H. F. KLINGENER 2,717,929

PHONOGRAPH PICKUPS

Filed April 10, 1952 5 Sheets-Sheet 4

INVENTOR.
H. F. KLINGENER

BY

Greene, Pineles & Durr
ATTORNEYS

Sept. 13, 1955 H. F. KLINGENER 2,717,929

PHONOGRAPH PICKUPS

Filed April 10, 1952 5 Sheets-Sheet 5

INVENTOR.
H. F. KLINGENER

BY Greene, Pineles & Durr

ATTORNEYS 2,717,929

PHONOGRAPH PICKUPS

Harry F. Klingener, Valley Stream, N. Y., assignor to Sonotone Corporation, Elmsford, N. Y., a corporation of New York Application April 10, 1952, Serial No. 281,622

9 Claims. (Cl. 179—100.41)

This application is a continuation-in-part of my application Ser. No. 212,130, filed February 21, 1951.

This invention relates to phonograph pickups, and more particularly to phonograph pickups which are utilized for transducing undulations of record traces, usually in the form of an undulating record groove, into corresponding electric signal waves.

Although the present invention was evolved in connection with phonograph pickups intended for use with laterally-cut record groove traces generally used in making conventional phonograph records, and specific exemplifications of such pickups will be herein described, the principles of the invention are also applicable for pickups designed for use with vertically-cut record grooves.

All generally used phonograph pickups have a mechano-electric transducer which is driven by a stylus engaging the moving record groove of the record disc or the like for translating the undulations of the record trace into corresponding electric signals. The stylus is usually carried on the forward end of a transducer drive-rod which transmits the undulations of the stylus to the transducer.

To satisfy the demand for pickups provided with two styli having different tips for selective use with relatively wide and deep record grooves or with relatively narrow and shallow record grooves, there have come into use turnover pickups with two oppositely directed styli, the pickup with its two styli being arranged for rotation over an angle 180° for selectively bringing in one or the other of the two differently tipped styli into scanning engagement with a record groove. However, such prior art turnover pickups are of complicated construction and have various other disadvantages. Accordingly, most of the generally used phonograph pickups intended for operation with record grooves of different depth are equipped with a single stylus, the tip of which is given a special configuration, which is a compromise between the configuration required for scanning with the best efficiency record groove of small depth and width with that required for scanning with best efficiency record grooves of relatively large depth and width.

Among the objects of the present invention is a phonograph pickup having essentially a fixed transducer structure, such as used in pickups intended for operation with a single stylus, but having a stylus arrangement which makes it possible to use such fixed transducer structure with two different styli tips, one shaped for cooperation with a record groove of very small depth and width and one shaped for cooperation with a record groove of a much greater depth and width.

The foregoing and other objects of the invention would be best understood from the following description of exemplifications thereof, reference being had to the accompanying drawings, wherein Fig. 1 is a side elevational view of one form of a phonograph pickup of the invention with one of its styli in a record groove scanning position;

Figure 2:
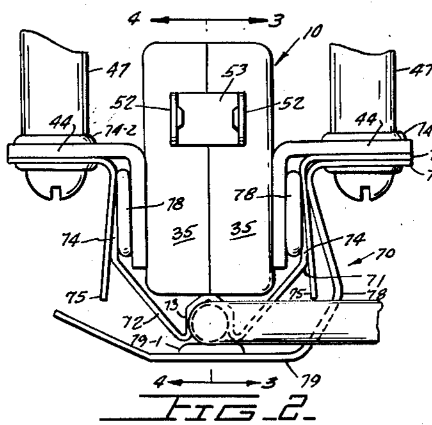
Fig. 2 is a rear end view of the pickup shown in Fig. 1.
Figure 1:
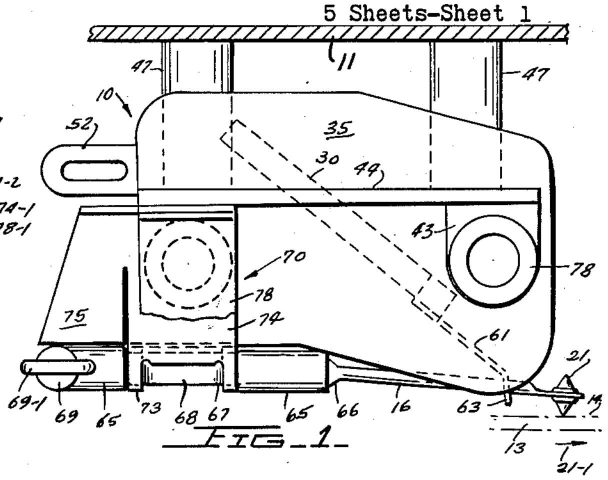
Figure 3A:
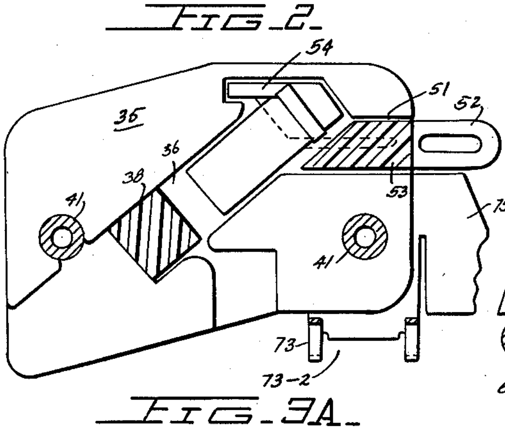
Fig. 3 is a partial cross-sectional view along line 3—3 of Fig. 2.
Figure 3:
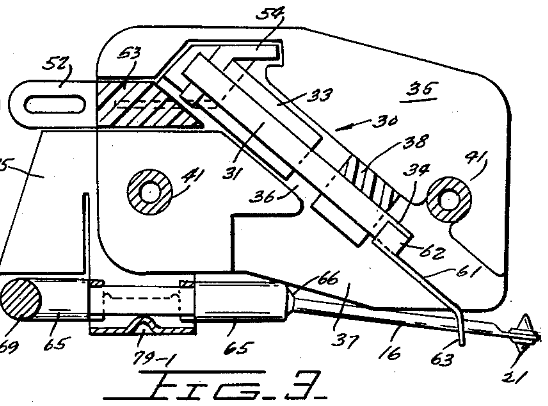
Figure 4:
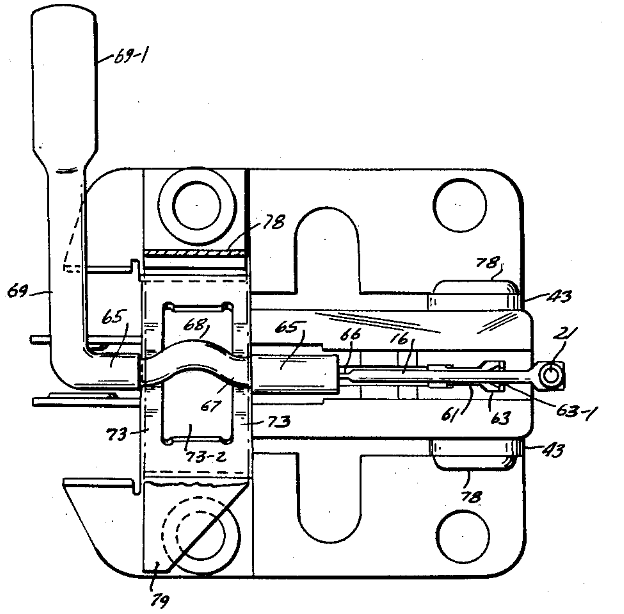
Figure 5:
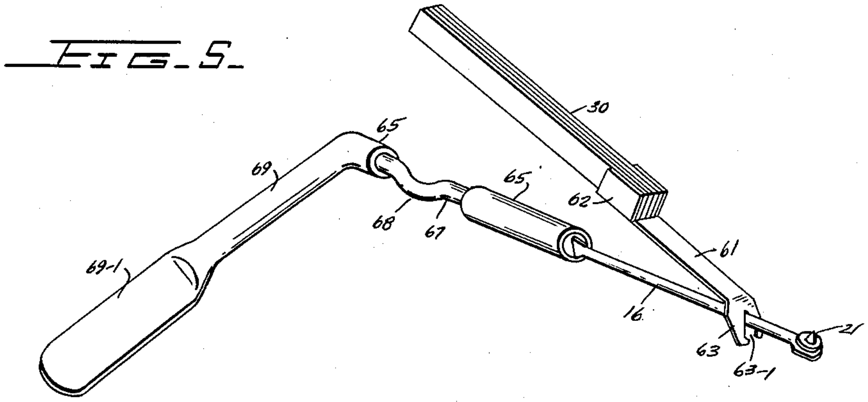
Figure 6:
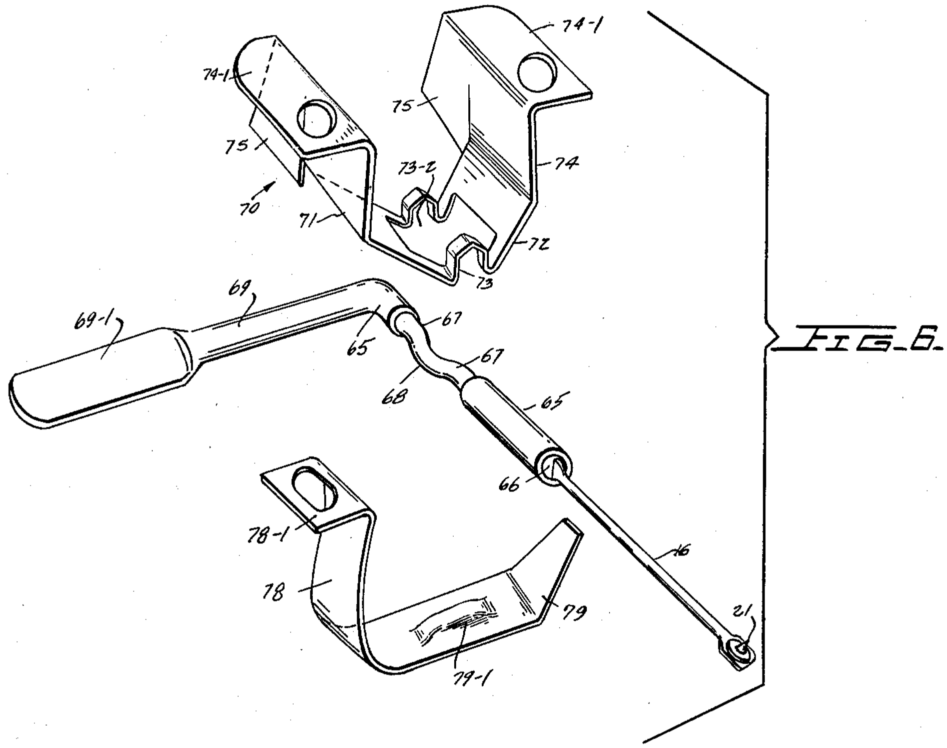
Figure 6A:
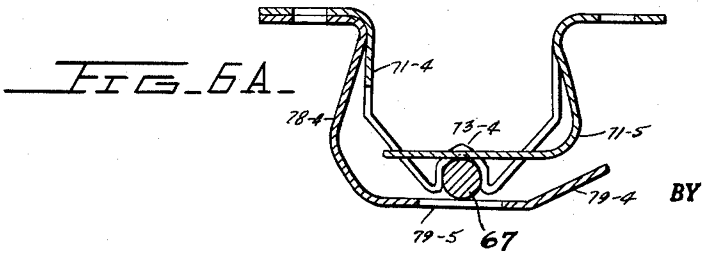
Figures 7, 8, 9, 10:
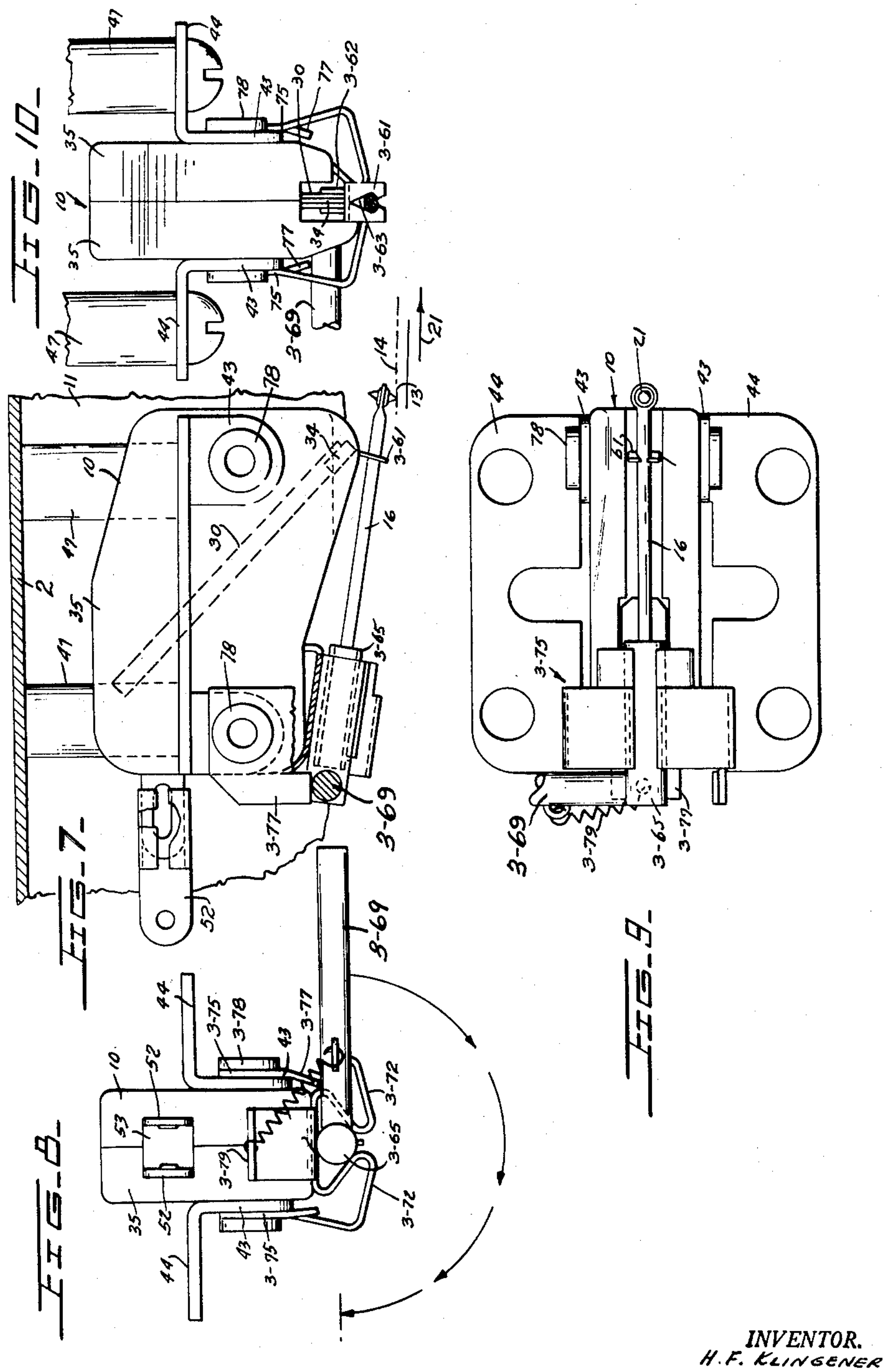
Figures 11, 12, 13, 14, 15:
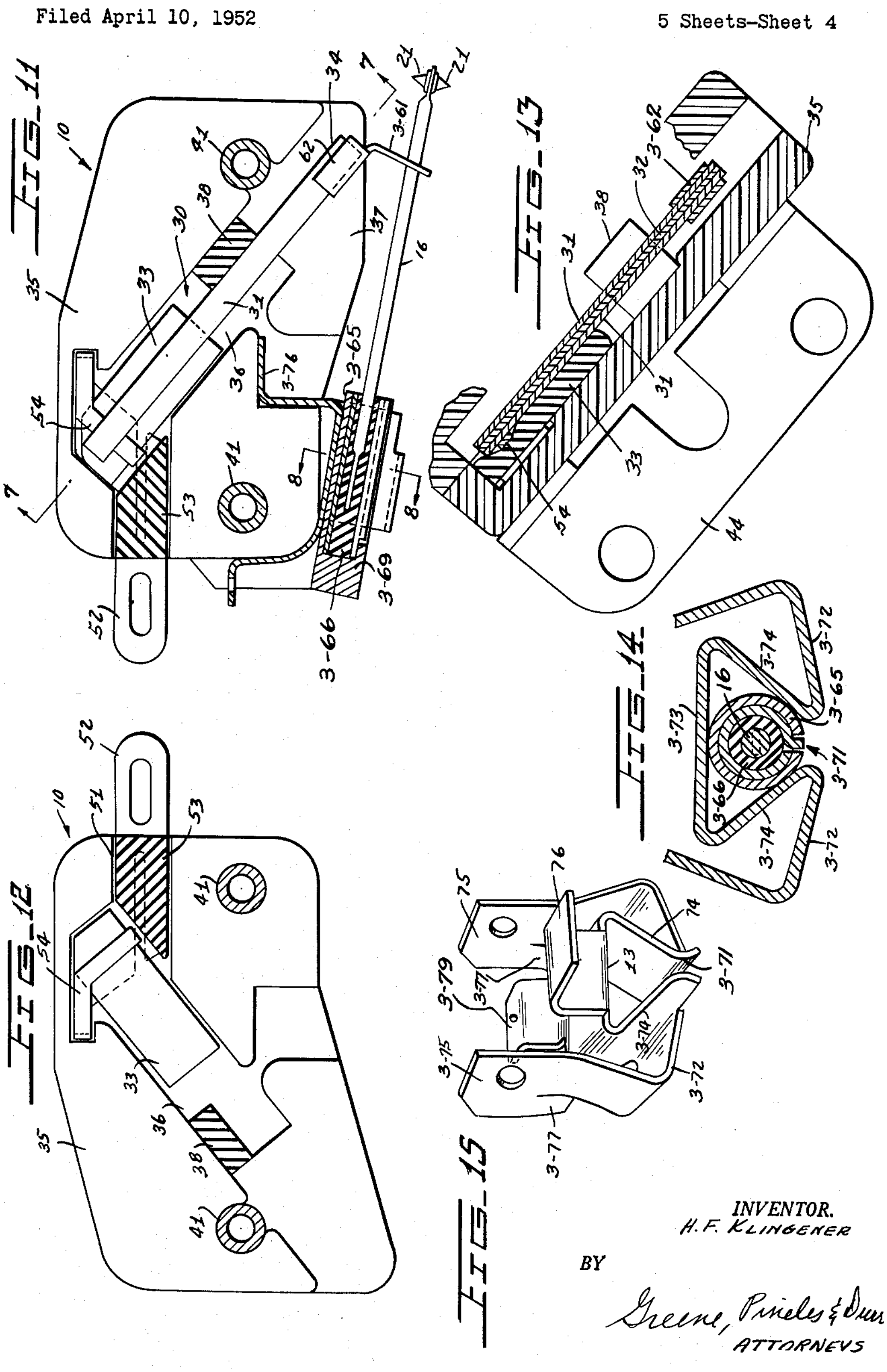
Figures 16, 17:
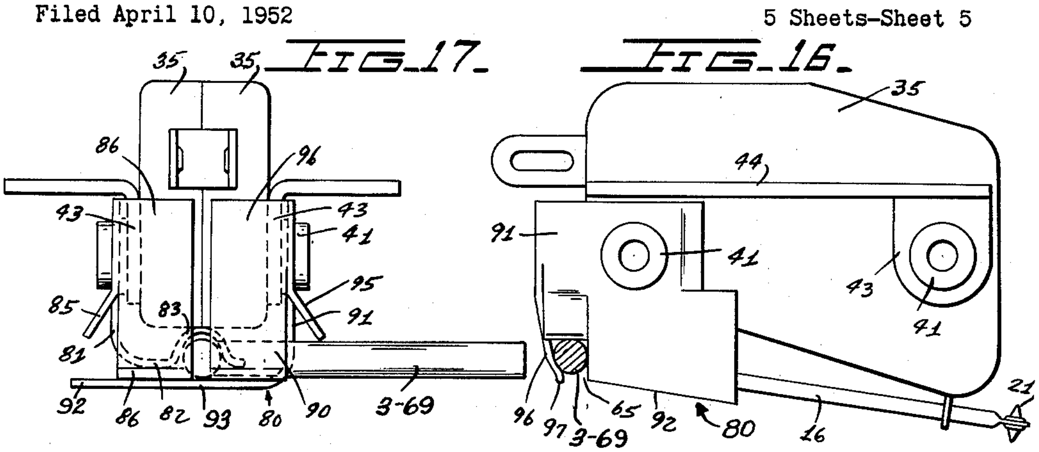
Figure 19:
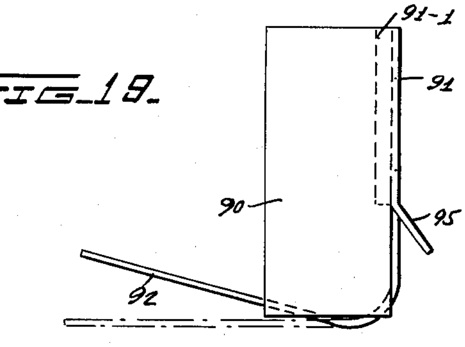
Figure 18:
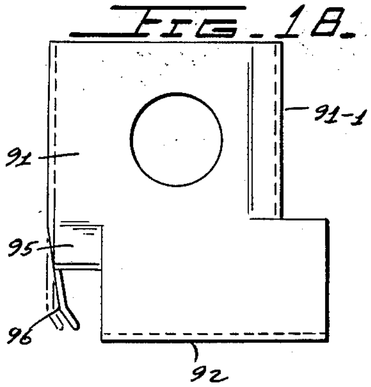
Figure 20:
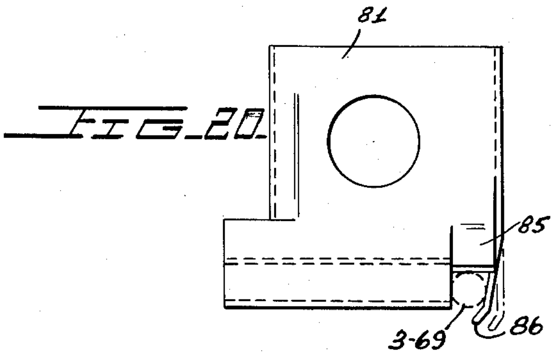
Figure 21:
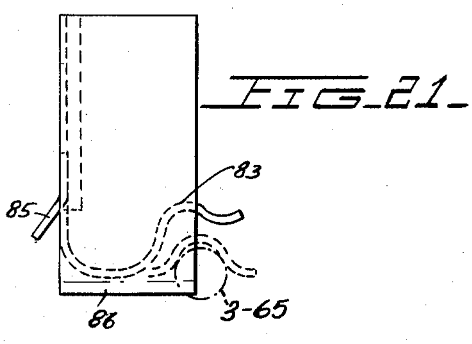
Figure 22:
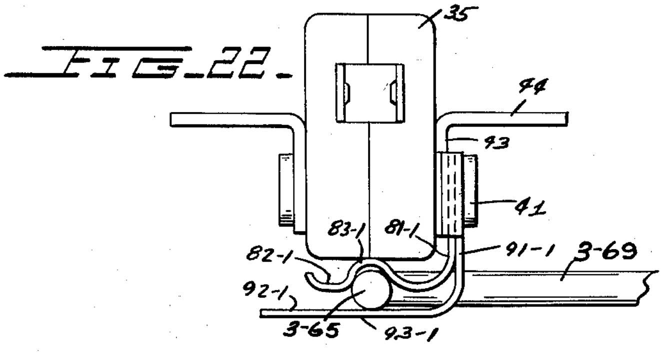

Fig. 3–A is a partial cross-sectional view along line 4—4 of Fig. 2 showing the pickup with the stylus drive-rod and transducer member removed;

Fig. 4 is a bottom view of the pickup shown in Fig. 1;

Fig. 5 shows the operative relationship of the fixed transducer of member 30, the turnover stylus drive rod arranged for detachable coupling connection thereto;

Fig. 6 is an exploded view of the stylus drive rod and the cooperating mounting elements through which it is operatively held by the pickup casing;

Fig. 6A is a vertical cross-sectional view of a modification of the mounting elements for the detachable stylus drive rod;

Figs. 7, 8 and 9 are views similar to Figs. 1, 2 and 4 of a modified form of phonograph pickup of the invention;

Fig. 10 is a front end view of the pickup of Figs. 7 to 9;

Fig. 11 and 12 are views similar to Figs. 3, 4 of the pickup shown in Figs. 7 to 10;

Fig. 13 is a cross-sectional view along line 13—13 of Fig. 11, and shows also the corresponding similar parts of the pickup of Figs. 1 to 6;

Fig. 14 is a cross-sectional view along line 14—14 of Fig. 11;

Fig. 15 is a perspective view of the mounting support of the stylus drive rod of the pickup of Figs. 7 to 10;

Fig. 16 and 17 are views similar to Figs. 1, 3 of still another form of pickup exemplifying the invention;

Figs. 18 and 19 are side and end views, respectively, of one of the two mounting members of the stylus drive rod mounting supporting of Figs. 16, 17;

Figs. 20 and 21 are side and end views, respectively of the other mounting member of Figs. 16, 17; and Fig. 22 is an end view similar to Fig. 17 of a further modification of a pickup of the invention;

Fig. 16 is a view similar to Fig. 11 of a further modification of the drive rod mounting support for a pickup of the invention such as shown in Figs. 10 and 11.

Although the phonograph pickups of the present invention may be operated with any of the known types of mechano-electric transducer structures—including these utilizing magnetic structures, electrical resistance elements and piezoelectric structures for converting mechanical strains or motion into electric signals—the present invention will be described in connection with a pickup utilizing a piezoelectric transducer of the type disclosed in the co-pending applications Serial No. 727,152 filed February 7, 1947 and Serial No. 772,934 filed September 9, 1947, assigned to the assignee of the present application.

Figs. 1 to 6 show one form of a pickup 10 exemplifying the invention. In the form shown, Fig. 1 shows the pickup 10 in its operative position held on the downwardly facing side of the front end of a tone-arm 11 with one of its two styli 21 engaging a record groove trace 14 of a conventional record disc 13. The record disc 13 is arranged to rotate in a conventional way in clockwise direction around a generally vertical axis and the individual spiral record traces 14 of the disc 13 are of substantially circular shape. The tone-arm 11 has a rear end not shown which is mounted in a conventional way so as to rotate around a vertical axis and also for upward tilting. Fig. 1 is intended to show the downward stylus 21 engaging a groove portion 14 of the clockwise rotating disc 13 moving in a forward record playing direction indicated by arrow line 21–1, which is substantially tangential to the circular record groove engaged by the stylus. The axial direction of the longitudinal stylus drive rod 16 extends substantially in a vertical plane through the forward playing direction 21–1 of the record groove, in generally the same direction.

In the particular phonograph shown in Fig. 1 the record trace 14 is formed of a laterally-cut record groove which imparts to the pickup stylus 21 a lateral undulatory motion, but as explained before, the pickup 10 of the invention shown may be designed for operation with a vertically cut record groove.

The pickup 10 (Figs. 1 to 6) comprises a mechano-electric transducer, generally designated 30 (Figs. 3, 10), shown formed of two strip-like piezoelectric transducer elements 31 secured to the opposite sides of a backing sheet element 32 and forming with its a bilaminate piezoelectric transducer structure which when bent or strained transversely to its length will generate corresponding aiding voltages impressed on the outwardly facing electrode surfaces of the two piezoelectric elements 31.

In the form shown, each of the two piezoelectric elements 31 consists essentially of a thin solid dielectric layer of ceramic titanate material and two surface electrodes united to the extended opposite outer surfaces of the dielectric layer so as to form therewith a capacitor structure. The surface electrodes are formed by fusing at high temperature a film of silver-glass frit to the electrode surfaces of the dielectric layer.

By way of example, each piezoelectric transducer element 31 of the particular pickup shown may have a dielectric layer consisting essentially of barium titanate having a thickness of about 0.010 inch. The width of the dielectric layer and of the backing sheet may be $\frac{5}{64}$ inch. The length of the transducer 30 may be $\frac{3}{4}$ inch. The backing strip may be about 0.005 inch.

The lever-like piezoelectric transducer 30 is retained in operative position between two elastomer pads 33 of a plasticized elastomer substance (Figs. 3, 4, 10) and arranged to exert on the transducer elements 31 elastically compliant reaction forces resisting their displacement so as to cause them to generate electric signal voltage corresponding to the undulatory strains or motion imparted to a forward drive end 34 of the transducer 30.

The elastomer pads may be made of a material such as a vinyl chloride compound or the like, which embodies sufficient plasticizer substance to serve as plastic elastomers which are effective in assuring that they exert on the piezoelectric strip elements 31 reaction forces which cause proper distribution of the mechanical strains throughout their dielectric layer when the front end 24 of the transducer structure is undulated by the movement of the stylus.

The two elastomer pads 33 are held in their proper operative position by a housing structure consisting of two housing walls 35 suitably secured to each other as by screws or hollow rivets 41 shown.

In the form shown, the two casing walls 35 are of substantially rigid, molded, insulating material. The inwardly facing sides of the two housing walls 35 are provided with elongated recesses providing an elongated compartment 36 of greater width than the transducer structure 30 and for holding therein the two elastomer pads 33 in their operative position pressing against the opposite sides of the elongated transducer structure 30.

Extended parts of the inwardly facing sides of the two casing walls 35 are held clamped to each other in abutting relation by the fastening rivets 41. The transducer compartment 36 is open at its front end 37 in which the drive-end portion 34 of the transducer structure 30 is positioned. To prevent turning or movement of the elongated lever-like transducer structure 30 in a vertical plane, an additional elastomer pad 38 of similar material is retained clamped between the opposite compartment walls of the two casing walls 35 so that its downwardly facing side engages an upwardly facing edge region of an intermediate part of the transducer 30 thereby restraining its movement in an upward direction.

The fastening rivets 41 also hold fastened against the outer sides of the two casing walls 35 of the pickup mounting brackets 43 having horizontal arms 44 with holes for receiving screws by means of which the pickup is secured to mounting bosses 47 provided on the downwardly facing side of the forward part of the tone-arm 11.

Within recessed inwardly facing portions along the rear region of the two casing walls 35, along their rear end, are retained two terminal members 51 provided with outwardly projecting terminal prongs 52. The terminal members 51 are made of a relatively firm strip of metal, such as brass, and they are retained in their clamped position between the two housing walls by a compressed elastic insulating member 53, such as rubber, interposed therebetween (Figs. 2, 3, 4).

The inner end of each relatively firm terminal member 51 is provided with a relatively flexible spring-like tail portion 54 folded in the way indicated in Figs. 3 and 4, over the rear region of the adjacent elastomer pad 33 and held pressed thereby into contact engagement with the adjacent outer electrode surface portion of the piezoelectric element 31 of the transducer structure 30. In this manner, the two external terminal projections 52 provide opposite polarity terminal connections to the outer electrode surfaces of the piezoelectric transducer structure 30.

A forward drive portion 34 of the lever-like piezoelectric transducer 30 (Fig. 3) is drivingly coupled to the stylus drive-rod member 16, the forward end of which carries the two oppositely projecting styli 21. In the form shown, the forward drive portion 34 of the piezoelectric transducer 30 has secured thereto an elongated drive extension 61 extending downwardly and forwardly into the open front end 37 of the transducer compartment 36 and shown projecting beyond the lower boundary of the forward part of the two casing walls 35. The drive extension 61 is shown formed of a relatively stiff sheet metal strip provided at its rear wide two ears 62 bent into U-shaped formation which is insulatingly affixed, as by a suitable insulating cement, to the forward drive portion 34 of the transducer 30 so as to form a fixed drive extension thereof. The elongated downwardly and forwardly projecting tongue-like drive extension 61 is provided at its front end with a coupling end 63 having recess or perforation 63–1 serving as a coupling seat for receiving therein and detachably holding in coupling driving engagement, the forward region of the stylus drive-rod 16 extending with its longitudinal axis lengthwise below the bottom center region of the pickup housing walls 35.

The relatively long drive extension 61 is designed to be relatively flexible in the direction of a vertical plane through its longitudinal axis so as to prevent the transmission of undesirable vertical motion but to have sufficient lateral stiffness for transmitting to the transducer 30 the lateral forces exerted on the stylus 21 by the lateral undulations of the record groove. If the pickup of the type shown is intended for use with a vertically undulating record groove, the drive extension 61 will be given the greater flexibility in a lateral direction and relatively greater stiffness in a vertical direction.

The stylus drive-rod 16 may be formed of a solid or tubular strip of metal and has secured to its front end the two oppositely projecting styli 21. The two styli 21 may form part of a single stylus structure having oppositely directed pointed stylus tips. Alternatively, the two styli 21 may form independent stylus units, each held anchored within a mounting collar affixed within a perforation or forming a fixed part of the forward end of the stylus drive rod 16.

The pickup shown in Figs. 1 to 6, being intended for use with a laterally undulating record groove trace, has a stylus drive rod 16 designed to be relatively flexible in the direction of a vertical plane through its longitudinal axis so as to bias the stylus with only very slight pressure forces, such as about 5 grams toward the scanned record groove, but to have sufficient lateral stiffness for transmitting to the transducer 30 the lateral forces exerted on the stylus by the lateral undulations of the record groove. If the pickup of the type shown is intended for use with a vertically undulating record groove, the stylus drive rod will be given the greater flexibility in lateral direction and relatively greater stiffness in vertical direction.

The vertically compliant, laterally stiff stylus drive rod 16 in cooperation with the likewise vertically compliant, laterally stiff drive extension 61 assure suppression of disturbing undesirable vertical forces that may be transmitted by one of the styli 21.

According to the invention, the two-stylus drive rod of a phonograph pickup is arranged to be carried by the pickup structure so that the stylus drive-rod may be independently rotated or turned over an angle of 180° around its axis while the transducer structure driven by the drive rod remains fixed in its position on the tone-arm.

In the form shown (Figs. 1 to 6), the stylus drive-rod 16 is provided at its rear end with a relatively rigid enlarged generally cylindrical pivot member 65 serving as a mounting portion thereof which is rotatably seated within a rotary guide seat structure generally designated 70 held affixed to the bottom rear part of the pickup casing or housing 35. The rotary guide structure 70 is shown formed of an inner guide structure 71 and a co-operating outer guide structure 78 which are providing between them a rotary guide seat arranged to rotatably support and guide the cylindrical pivot member 65 of the stylus drive-rod in an axially fixed position so that it may be turned 180° from one stylus position to the opposite of its two stylus positions.

In the form shown, each of the two rotary guide structures or members 71 and 78 are made of elastic strong sheet metal and they are so shaped and arranged as to permit ready removal and ready replacing of the cylindrical stylus pivot member 65 in its operative position within the guide seat of the pickup, with its stylus drive-rod 16 in detachable operative coupling engagement with the coupling recess 63—1 of the transducer drive extension 63.

The inner guide member 71 of the stylus drive-rod is formed of a generally saddle-like U-shaped sheet structure having an intermediate seating section 72 underlying the rear bottom portion of the pickup housing 35 and provided with a re-entrant groove-like bearing seat 73 arranged to serve as a bearing for the cylindrical stylus pivot member 65. The seating section 72 of the inner guide member 71 is adjoined by two side arms 74 overlying and secured to the side walls of the pickup casing 35 and for holding its seating section 73 in its operative position. In the form shown, the side arms 74 are provided with laterally bent fastening plugs 74—1 which are secured, as by hollow rivets 74—2 to the overlying mounting bracket arms 44 of the pickup housing.

The outer guide member 78 is likewise formed of elastic sheet metal and is designed as a cantilever arm structure secured to the pickup housing and having a free arm 79 overlying the bearing seat 73 of the inner guide structure so as to elastically bias and hold positioned therein the cylindrical stylus pivot member 65. In the form shown, the outer guide member 78 has a side arm overlying the side arm 74 of the inner guide member 71, and it has a laterally extending fastening lug 78—1 which is clamped clamped over the similar fastening lug 74—1 of the inner guide member to the overlying mounting bracket arm 44 of the pickup housing by the same common hollow rivet 74—2. The free arm 79 of the outer guide member is designed to permit outward flexing thereof when lifting the stylus pivot member 65 from its bearing seat groove 73 for removing or replacing it in its operative position therein.

The two side arms 74 of the inner guide member 71 are also provided with stop extensions 75 serving as limit stops against which the laterally extending stylus turn grip 69 is brought to a stop when turning the stylus drive-rod 16 over an angle of 180° from one to the opposite of its two stylus positions. With this arrangement, it is merely necessary to seize the outer end of the stylus turn grip 69 and turn it 180° from one stop 75 against the opposite stop 75, whenever it is desired to bring another of the two opposite styli 21 into a groove scanning position shown in Figs. 1 and 3.

In the form shown (Figs. 1, 2, 4, 6), the stylus pivot member 65 of the stylus drive-rod is provided with an intermediate seating section 67 of somewhat reduced diameter arranged to engage the bearing seat 73 of the inner guide member 71. The two adjoining wider cylindrical portions of the stylus pivot member 65 form seat limits engaging the outer edges of the recessed bearing seat groove 73 of the inner guide member 71 to assure that the stylus pivot member 65 with its stylus drive rod 16 are maintained in an axially fixed position while permitting rotary movement of the stylus pivot member 65 between its two opposite styli positions.

The stylus pivot member 65 of the turnover stylus is provided with novel biasing means for assuring that whenever the stylus drive-rod is turned past its mid position, it will be automatically brought to either one or the other of its two opposite styli positions.

In the form shown, the intermediate stylus pivot seating portion 67 is provided with a laterally projecting or offset bias element 68 shaped and arranged to come into engagement with the overlying portion of the inwardly pressing outer guide member arm 79 so as to cause the excentrically bias element to be turned toward either one or opposite of its two inner positions when it is brought past a mid position while turning the stylus pivot member 65 from one to the opposite of its two styli positions. The bias element 68 is shown provided by an outwardly bent intermediatee portion of the intermediate seating section 67 of the stylus pivot member 65. The cooperating bearing seat structure 73 of the inner guide member 71 is provided with a cut-out or recess 73—2 into which the excentric bias element 68 of the stylus pivot seating section 67 may enter when it is turned inwardly by the overlying inwardly pressing outer arm 79 of the outer seating member 78. In the form shown, the outer guide arm 79 of the guide structure 70 is provided with an inwardly deformed ridge-like bias portion 79—1 which engages the bias element 68 of the stylus pivot member 65 throughout the range of its turning movement from one to the other end position corresponding to the two opposite styli positions.

The wider sections of the relatively rigid stylus pivot member 65 is shown formed of a hollow tubing seated over and affixed to a rod portion of smaller diameter forming the intermediate seating portion 67 thereof with its offset excentric bias element 68. The turn handle grip 69 of the stylus pivot member 65 is formed by a rearwardly bent portion of the wider rear section thereof and its end is flattened to provide a flat end grip portion 69—1.

The forward hollow portion of the stylus pivot member 65 is arranged to hold therein, in a fixed aligned position, the rear end of the stylus drive rod 16 so that the two styli are always in the proper groove engaging and tracing position when stylus turn grip 69 is brought against either one of its two opposite end stop members 75. In the form shown, the interior hollow forward portion of the stylus pivot member 65 is filled with a body 66 of elastomer material and the rear end of the stylus drive rod 16 is flattened and seated within a slit of the elastomer body 66 so that the two styli are in proper axial position relatively to the turn grip 69 of the stylus pivot member 65 to assure that each stylus is in its proper groove tracing position when it is brought to one of its two stylus positions, when the stylus pivot member is turned from one toward the other of its two stops 75.

Under normal operating conditions with one of the two opposite styli 21 in a scanning engagement position, the laterally offset bias element 68 of the stylus pivot member 65 is biased to an end position in a generally horizontal plane within the rotary guide seat 73, having held therein by the biasing ridge 79—1 on the outer guide member 79. Whenever it is desired to selectively bring another of the two opposite styli 21 to a groove scanning operative position, it is merely necessary to seize the outer end of the turn-grip member 69 and turn it past the mid position. Thereupon, the biasing ridge 79—1 of the outer guide member 78 acting on the biasing element 68 of the stylus pivot member 65 brings it to the other stylus end position.

The foregoing arrangement provides simple but effective means for positively bringing the turnover stylus drive rod 16 to one or the other of its opposite end positions whenever the stylus drive rod 16 is turned past the midway point towards the opposite stylus position.

Fig. 6–A shows a modified form of a stylus pivot mounting structure generally similar to that of Figs. 1 to 6, but wherein the inner guide member is provided with a bias element arranged to bring the offset bias element 68 of the turnover stylus pivot member 65 to one or the other of its stylus end positions whenever the stylus pivot member 65 is turned by its turn arm 69 past the mid position. The stylus mounting structure of Fig. 6–A has an inner guide member 71—4 and an outer guide member 78—4, each of strong sheet metal and generally similar to the corresponding inner guide member 71 and outer guide member 78 of the mounting structure of Figs. 1 to 6. The inner guide member 71—4 is provided along its intermediate seating section with a re-entrant groove-like bearing seat 73—4 for holding seated therein in an axially fixed but rotatable position the pivot section 67 of the stylus pivot member 65 of the form shown in Figs. 1 to 5, but having an offset bias element similar to bias element 68 of pivot member 65 of Figs. 1 through 6 but offset in opposite direction. The stylus pivot section 67 of the similar stylus pivot member 65 has its offset bias element 68 arranged to be actuated to one or the opposite end position corresponding to the two opposite styli position of the stylus drive rod 16 when the stylus turn handle 69 is turned past the mid position in the same manner as explained in connection with Figs. 1 to 6. However, in the arrangement of Fig. 6–A, an intermediate portion of the inner guide tongue-like arm 71—5 provided on member 71—5 serves as the actuating element acting on the bias element 68 of the stylus pivot member 65 for bringing it to one or the other of its two end positions. The tongue-like actuating arm 71—5 is shown formed by partially cutting the inner sheet guide member 71—4 at its intermediate region along lines parallel to its side edges. The tongue-like actuating member 71—5 is bent and shaped in the manner indicated in Fig. 6–A so as to elastically bias by its spring action the offset bias element 68 of the stylus pivot member 65, so that when it is moved past the mid position—which is towards the top of the bearing seat 73—4 as seen in Fig. 6–A—the biasing action of the actuating arm 71—5 will cause it to be moved to its end position thereby completing the turning movement of the stylus pivot member 65 towards the opposite stylus position. The overlying arm portion 79—4 of the outer guide member 78—4 may be provided with a cut-out 79—5 in the region overlying the bias element 68 of the stylus pivot member 65 so as to eliminate any possible interference with the movement of the stylus pivot bias element 68 from one to the opposite end position when turning the stylus drive rod 16 to an opposite stylus position. Otherwise, the stylus drive rod mounting structure of Fig. 6–A is substantially identical with that of Figs. 1 to 6.

Figs. 7 to 15 show a phonograph pickup formed of similar elements as that of Figs. 1 to 6, but provided with a modified form of mounting and guide structure for a similar turnover stylus drive rod 16 with a rigid pivot member 3—65.

In the pickup of Figs. 7 to 15, the forward drive portion 34 of the piezoelectric transducer member 30 is provided with a modified form of drive extension 3—61 shown coupled through a similar coupling recess 3—63 to the stylus drive rod 16. The flexible stylus drive rod 16 of the pickup of Figs. 7 through 15 is identical with that of Figs. 1 through 6. The flattened rear end of the flexible stylus drive rod 16 is carried in its operative position by a relatively stiff or rigid coaxial elongated mounting member or sleeve 3—65 having a lateral turn grip member 3—69 by means of which the stylus drive rod 16 may be turned about its axis for bringing either one of the styli into a groove engaging position, within the hollow interior of the stiff elongated mounting member 3—65 of the stylus drive rod 3—16 (Figs. 11, 14) is positioned a coaxial elongated mounting body 3—66 of rubber-like or elastomer material holding embedded therein the flatted elongated rear end portion of the flexible drive rod 16 so that the elastomer body 3—66 forms the sole connection through which the relatively stiff or rigid sleeve carries the flexible stylus drive rod 16 with its one or more styli.

The pivot member 3—65 of the stylus drive rod 16 is rotatably mounted in a modified form of rotary guide structure generally designated 3—73 and shown in perspective in Fig. 15. The rotary guide structure 2—72 is shown formed out of sheet metal shaped and bent to provide an intermediate rotary guide seat 3—71 formed of three guide segments 3—73, 3—74 rotatably supporting and guiding the cylindrical pivot member 3—72 of the stylus drive rod 16. The rotary guide structure 3—72 is held affixed to the outer surfaces of the rear wall portions of the casing walls 35 by two clamping arms 3—75 extending from the lateral guide segments 3—74 of the rotary guide seat 3—71. In the form shown, the two clamping arms 3—75 of the guide structure arm extended in overlapping relation over the bracket arms 43 of the pickup housing 35 and they are affixed thereto and to the casing walls 35 by the fastening rivet 41. To fix it against rotation about rivet 41, the seat segment 3—73 of the rotary guide structure is provided at its front with a bracing extension 3—76 bearing against a recessed downwardly facing wall portion of the casing walls 35 (Figs. 11, 15).

The clamping or fastening arms 3—75 of the rotary guide structure 3—72 of the stylus drive rod 16 are also provided with stop extensions 3—77 serving as limit stops against which the stylus turn-grip 3—69 is brought when turning the stylus drive rod 180° from one stylus scanning position to the opposite stylus scanning position. With this arrangement, it is merely necessary to seize the outer end of the turn-grip 3—69 of the stylus drive rod 16 and turn it 180° from one end-stop 3—77 against the opposite end stop 3—77 whenever it is desired to selectively bring another of the two opposite styli 21 into a groove scanning operative position shown in Figs. 7 and 11.

The two lateral seat segments 3—74 of the rotary guide seat 3—71 for the cylindrical stylus pivot member 3—65 may be elastically flexed outwardly to permit removing of the cylindrical pivot member 3—65 of the stylus drive rod 16 from its rotary seating engagement within its rotary guide seat 3—71, or for replacing it therein. The elastic bearing and guide structure 3—72 may be so designed that—even in the absence of the biasing means provided for this purpose—its elastic restoring forces are sufficient to frictionally retain the cylindrical stylus pivot member 3—65 in each of its opposite operative position when the stylus drive rod is brought to any of its two end positions (Figs. 7, 11).

Means may also be provided to bring the turnover stylus drive rod 16 to one or the other of its opposite end positions whenever the stylus drive rod 16 is turned past the midway point toward the opposite end position. Thus, as shown in Figs. 8, 9 a tail portion 3—79 of the center segment 3—73 of the rotary guide structure 3—72 may be utilized as a support for one end of a biasing spring 3—79, shown as a coil spring, the other end of which engages a perforation or ear of the stylus turnover grip 3—69 so that once the grip 3—69 is turned past the midpoint between its two end positions, the biasing spring 3—79 will bring the grip 3—69 with the stylus arm 16 and its two styli 21 to the opposite end position.

Figs. 16 to 21 show another form of phonograph pickup exemplifying the invention. It comprises a transducer structure carried operatively held within a casing 35 at the forward end of the tone arm for actuation by a stylus drive rod 16, all these elements being substantially identical with those of the pickup of Figs. 7 to 13. However, the pickup of Figs. 16 and 17 is provided with a modified rotary guide structure generally designated 80 for frictionally maintaining the cylindrical pivot member 3—65 of the stylus drive rod 16 in any one of its two operative end positions and to permit ready turning of the stylus drive rod 16 with its two opposite styli 21 from one scanning position to the opposite scanning position. In the form shown in Figs. 16 and 17, the rotary guide structure 80 for the stylus pivot member 3—65 is formed of two guide sheet members 81, 91 of metal, for instance, each having a clamping arm affixed against the opposite casing side walls 35, respectively, of the pickup over its respective fastening bracket arms 43 by the common fastening screw or rivet 41.

The two guide sheet members 81, 91 are provided with two elastically flexible arms 82, 92 bent into overlapping relation to provide two guide seat portions 83, 93 forming between them a cylindrical guide seat for frictionally holding the elongated stylus pivot member 3—65 for the stylus drive rod 16 in its two operative opposite styli positions and to permit ready rotation of the stylus pivot 3—65 from one stylus position to the opposite stylus position.

Each clamped arm of the two guide structures 81, 91 is also provided with tongue-extension 85, 95, respectively, serving as limit stops limiting the movement of the turn-grip 68 of the stylus drive rod 16 to its two end positions.

The rear edge of each of the two clamped arms of the two guide sheet structures 81, 91 (Figs. 18—21) has an arm 86, 96, respectively, laterally bent along the rear surface of the pickup housing wall structure 35, and provided with a downwardly extending biasing spring arm 86, 96, respectively, bent to provide elastically flexible bias means for biasing the turnover grip to its one or the opposite of its two end positions when it is brought past the gate-like edge portion of the respective biasing tongues 86, 96 (Figs. 16, 18, 20).

Fig. 22 shows a phonograph pickup similar to that of Figs 16 and 17 provided with somewhat different rotary seating structure for the stylus pivot member 3—65. It comprises two guide sheet members 81—1, 91—1, each having one mounting arm by which they are secured over one of the two supporting bracket arms 43 of the pickup housing structure 35 with the common fastening screw 41. Each of the two fastened arms of the guide sheet members 81—1, 91—1 has an elastically flexible seat arm 82—1, 92—1 bent to provide two rotary seating members 83—1, 93—1 operatively arranged in a manner generally similar to the corresponding elements of the pickup described in connection with Figs. 16 to 21 and providing a rotary seat for the pivot member 65 of the stylus drive rod 16. The rotary stylus pivot seat structure of the pickup shown in Figs. 22 is otherwise similar to that described in connection with Figs. 16 and 17.

The seating arm 92 of guide sheet member 91 has an elastically flexible end portion forming with the adjacent arcuate portion of the opposite seating arm 82 an outwardly tapering gate for permitting ready insertion of the cylindrical pivot member 3—65 of the stylus drive rod 16 into its rotary seating position by moving it from the left to the right as seen in Fig. 17. By moving the stylus pivot member 3—65 in opposite direction from the right to the left as seen in Fig. 17, it may be readily removed from its seat in the guide seat structure 80 against the elastic biasing forces of the seating arms 92, 82.

The present application is directed to a detachable self-supporting stylus-drive structure for the mechano-electric transducer of a phonograph pickup, which comprises an elongated flexible drive member carrying at its free end two differently directed styli and having a rotatable coaxial seating region arranged for rotation adjacent the transducer structure while the transducer structure is maintained in a relatively fixed position so that by rotating the drive member either one of its two styli may be brought in a record engaging operative stylus position. The subject matter of the present application directed to a detachable self-supporting stylus-drive structure for the mechano-electric transducer of a phonograph pickup wherein a flexible stylus drive member carrying at its front end one stylus only has its rear end held in a coaxial elongated elastomer body of a stiff coaxial mounting structure which is arranged for detachable coupling to the transducer structure is the subject matter of a divisional application Serial No. 514,307, filed June 9, 1955 and assigned to the assignee of the present application.

The features and principles underlying the invention described above in connection with specific exemplifications, will suggest to those skilled in the art many other modifications thereof. It is accordingly desired that the appended claims shall not be limited to any specific features or details shown and described in connection with the exemplifications thereof.

I claim:

1. A stylus-drive structure for driving a mechano electric transducer structure of a phonograph pickup which comprises an elongated drive member arranged to be drivingly connected to said transducer structure and an elongated rotatable seating region arranged to be rotatably supported adjacent said transducer structure for rotation about an axis of rotation while said transducer structure is maintained in a relatively fixed position, said drive member having a flexible elongated drive portion coaxial with said elongated seating region and carrying at its free end two styli joined with their inward ends to a common mounting element of said flexible drive portion, said two styli extending outwardly from said mounting element in a plane substantially perpendicular to said axis so that by rotating said drive member about said axis either one of said styli may be brought into a record engaging operative stylus position.

2. In a stylus drive structure as claimed in claim 1, a coupling element of said flexible drive portion positioned between said styli and said seating region being arranged to be coupled to a movable portion of said transducer structure.

3. In a stylus drive structure as claimed in claim 1, said two styli extending in a plane substantially perpendicular to the axis of said drive member.

4. In combination with a stylus drive structure as claimed in claim 1, a mechano-electric transducer structure having a mounting structure with a guide portion rotatably supporting the seating region of said stylus drive structure so that said drive structure may be rotated relatively to said transducer structure for bringing either one of said styli into a record engaging position.

5. In the combination as claimed in claim 4, said transducer structure having a coupling portion arranged to engage a coupling element of said flexible drive portion positioned between said styli and said seating region so that an undulatory movement of either one of said styli will transmit a corresponding undulatory movement to said transducer structure.

6. In combination with a stylus drive structure as claimed in claim 1, a mechano-electric transducer structure having a mounting structure with a guide portion rotatably supporting the seating region of said stylus drive structure so that said drive structure may be rotated relatively to said transducer structure for bringing either one of said styli into a record engaging position, said transducer structure having a coupling portion arranged to engage a coupling element of said flexible drive portion positioned between said styli and said seating region so that an undulatory movement of either one of said styli will transmit a corresponding undulatory movement to said transducer structure, the coupling portion of said transducer structure including structural means for detachably coupling said coupling element to said stylus drive structure to said transducer structure and permit removal of said stylus drive structure from said transducer structure.

7. In combination with a stylus drive structure as claimed in claim 1, a mechano-electric transducer structure having a mounting structure including guide structure means having a guide portion rotatably supporting the seating region of said stylus drive structure so that said drive structure may be rotated relatively to said transducer structure for bringing either one of said styli into a record engaging position, the seating region of said stylus drive structure being detachably held in its operative position within the guide portion of said mounting structure.

8. In the combination as claimed in claim 7, said transducer structure having a coupling portion arranged to engage a coupling element of the flexible drive portion of said stylus drive structure when said stylus drive structure is held within the guide portion of said mounting structure.

9. In the combination as claimed in claim 7, the coupling portion of said transducer structure including structural means for detachably coupling said coupling element to said stylus drive structure to said transducer structure and permit removal of said stylus drive structure from said transducer structure.

References Cited in the file of this patent

UNITED STATES PATENTS

| | | |
|---|---|---|
| 2,328,952 | Burt | Sept. 7, 1943 |
| 2,479,894 | Andrews | Aug. 23, 1949 |
| 2,486,099 | Bauer | Oct. 25, 1949 |
| 2,518,861 | Burtch | Aug. 15, 1950 |
| 2,567,105 | Dreisbach | Sept. 4, 1951 |